July 8, 1924.
J. B. KLEIN
1,500,397
BRAKE FOR MOTOR VEHICLES
Filed Nov. 22, 1923     2 Sheets-Sheet 1
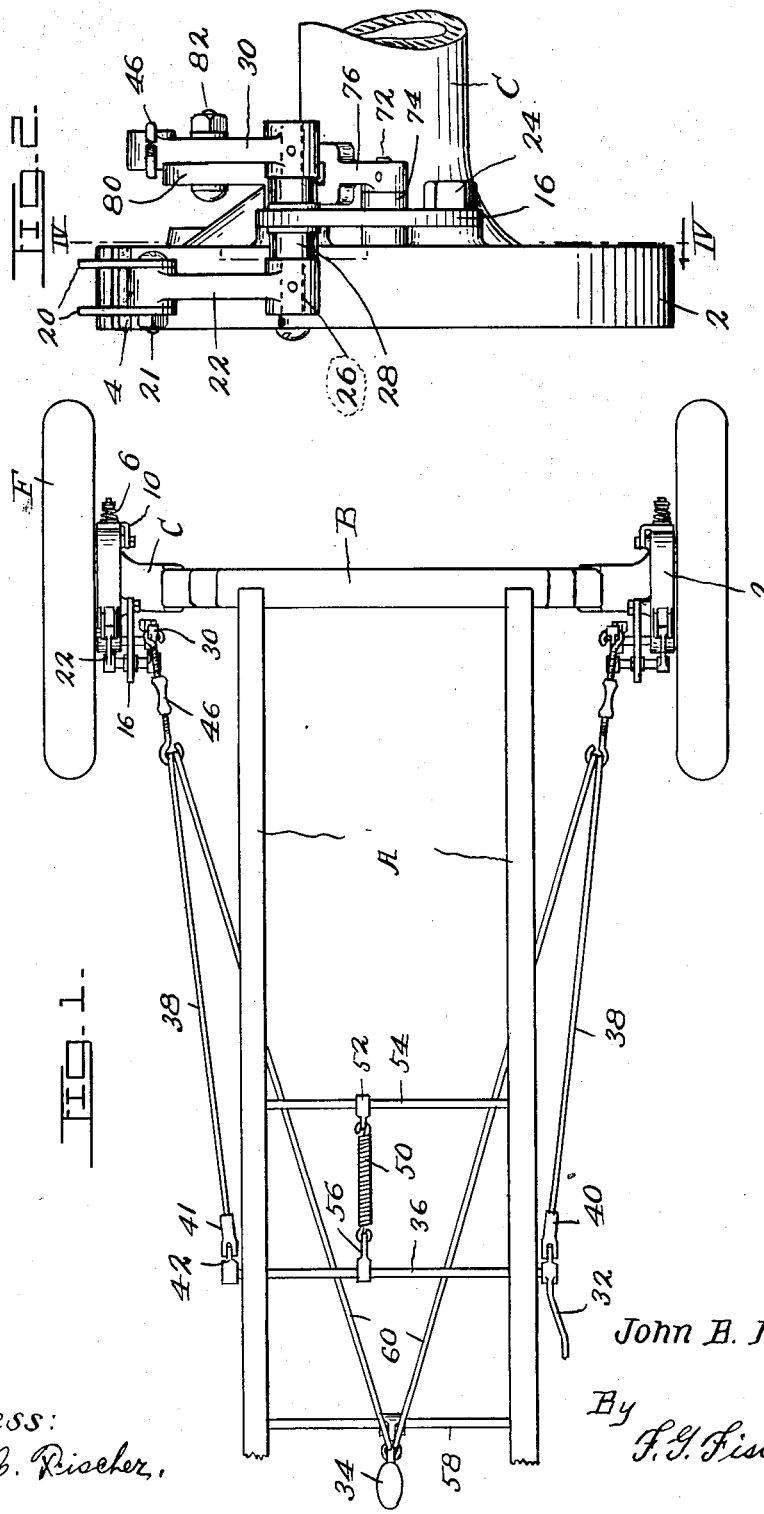
Witness:
Fred C. Risher.
Inventor
John B. Klein,
By
F. G. Fischer,
Attorney July 8, 1924.
J. B. KLEIN
1,500,397
BRAKE FOR MOTOR VEHICLES
Filed Nov. 22, 1923 2 Sheets-Sheet 2
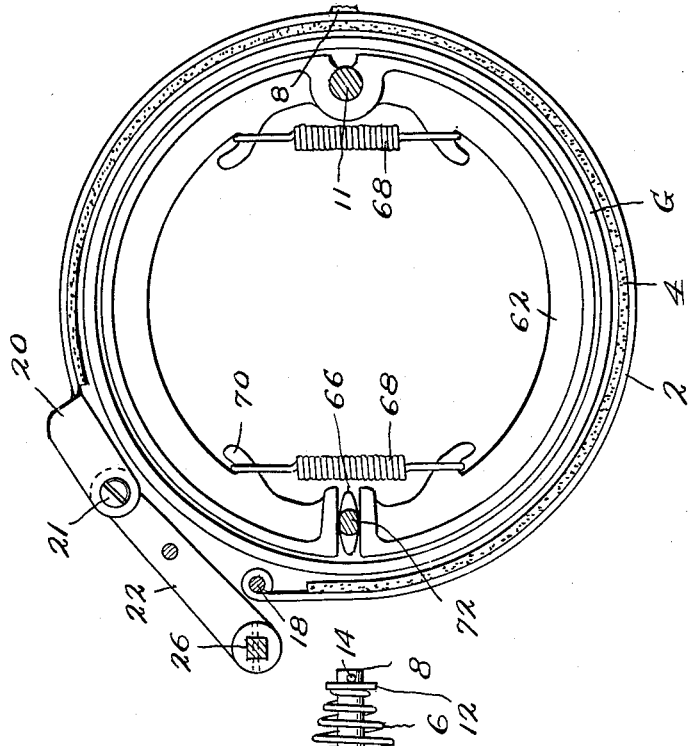
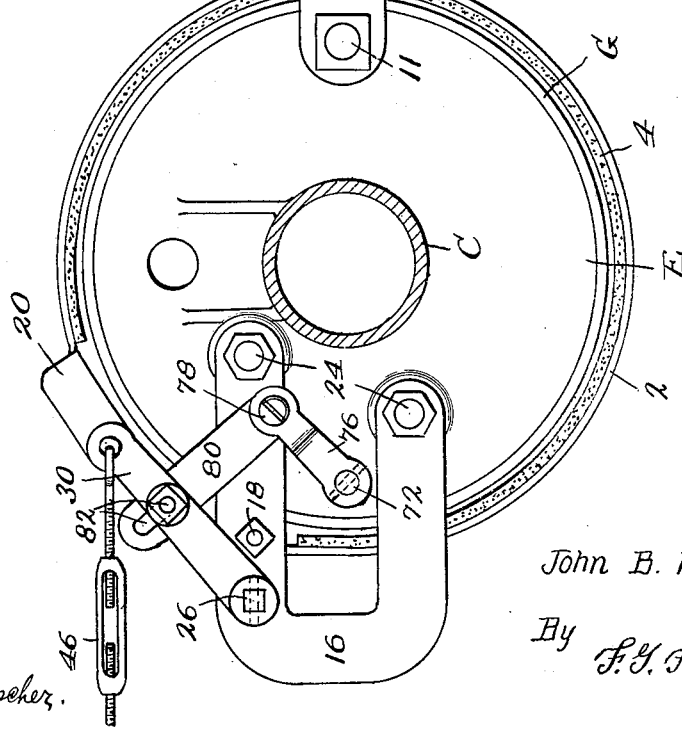
Inventor
John B. Klein,
By F. G. Fischer,
Attorney
Witness:
Fred C. Fischer.

Patented July 8, 1924.

1,500,397

UNITED STATES PATENT OFFICE.

JOHN B. KLEIN, OF KANSAS CITY, KANSAS.

BRAKE FOR MOTOR VEHICLES.

Application filed November 22, 1923. Serial No. 676,272.

*To all whom it may concern:*

Be it known that I, JOHN B. KLEIN, a citizen of the United States, residing at Kansas City, in the county of Wyandotte and State of Kansas, have invented certain new and useful Improvements in Brakes for Motor Vehicles, of which the following is a specification.

My invention relates to improvements in motor vehicle brakes, and my principal object is to provide a combination service and emergency brake which is so arranged that the service portion of the brake may be employed for gradually checking the vehicle, while the emergency portion is so arranged as to cooperate with said service portion in suddenly checking the vehicle when necessary, the two portions of the brake being combined and arranged in such manner that the emergency portion may be brought into action in sequence with the service portion by a single movement of the hand or foot, thereby avoiding the delay in reaching for the emergency brake lever where the brakes are independently arranged as heretofore.

A further object is to provide a service and emergency brake combined in one in such manner as to simplify the construction and reduce the cost of manufacture.

Other objects will hereinafter appear and in order that the invention may be fully understood, reference will now be had to the accompanying drawings, in which:

Fig. 1 is a broken plan view of a portion of a motor vehicle equipped with the brake mechanism.

Fig. 2 is an enlarged front elevation of one of the brake mechanisms with a portion of the actuating mechanism removed.

Fig. 3 is a side elevation of the brake mechanisms disclosed by Fig. 2.

Fig. 4 is an irregular vertical section on line IV—IV of Fig. 2, with the flange on the adjacent end of the rear axle housing removed to show the internal brake shoe and associate parts.

Referring now in detail to the different parts, A designates the longitudinal frame members of the chassis, B the rear spring, C the rear axle housing, E the flanges at the ends of the rear axle housing C, F the rear wheels, and G the brake drums fixed to said rear wheels, all of which are of any ordinary or preferred construction.

Referring now more particularly to the brake mechanism employed in carrying out the invention, 2 designates a resilient external brake band the expansion of which normally holds the lining 4 out of contact with the periphery of the drum G around the greater portion of which it extends. A conical spring 6 coacts with the band 2 in normally holding the lining 4 out of engagement with the drum G. Said spring 6 loosely embraces a stud 8 fixed to the band 2 and extending freely through an opening in a bracket 10 secured to the flange G by a bolt 11. The spring 6 is interposed between the bracket 10 and a washer 12 retained upon the stud 8 by a transverse pin 14.

One end of the brake band 2 is connected to a bracket 16 by suitable means such as a bolt 18, while its opposite end is turned up to form flanges 20 secured by a pivot 21 to the upper end of a lever 22. The bracket 16 is firmly secured to the adjacent flange E by suitable means such as bolts 24. The lever 22 is fixedly mounted at its lower end upon a shaft 26 the cylindrical portion of which is journaled in a bearing 28 projecting from the opposite sides of the bracket 16.

30 designates another lever fixedly mounted upon the shaft 26 and arranged to be actuated by any suitable manually controlled mechanism. In Fig. 1, I have shown such mechanism embodying both a hand lever 32 and a foot lever 34. The hand lever 32 is fixedly mounted upon one end of a shaft 36 journaled in suitable bearings, not shown, carried by the frame members A. Cables or rods 38 are connected at their forward ends by bifurcated members 40 and 41 to the lower end of the lever 32 and a crank 42, respectively. Said crank 42 like the lever 32 is also fixed to the shaft 36. The rear ends of the members 38 are connected to turn-buckles 46, whereby the parts may be properly adjusted in relation to each other. A coil spring 50 is connected by a lug 52 to a cross member 54 and the lower end of a crank 56, which latter is fixed to the shaft 36 to coact with the brake bands 2 in normally holding the linings 4 out of engagement with the respective drums G. The foot lever 34 is mounted upon a shaft 58 journaled in the frame members A and said foot lever 34 is connected to the turn-buckles 46 by cables or rods 60.

Referring now to the internal portion of the brake mechanism, 62 designates a contractile shoe consisting substantially of a split ring supported by the bolt 11 and a cam 66 interposed between the ends of said shoe 62. Coil springs 68 connected to lugs 70 on the shoe 62 coact therewith in normally holding the same in contracted position and out of engagement with the interior surface of the associate drum G.

The cam 66 is fixedly mounted upon a stub shaft 72 journaled in a bearing 74 projecting from the adjacent flange E and provided at its outer end with a fixedly mounted lever 76 connected at its free end by a pivot 78 to a link 80, which has a loose connection with the lever 30. Said loose connection may be of any suitable form. In Fig. 3 of the drawings it is shown in the form of a bolt and slot connection 82.

The operation is substantially as follows: The brake bands 2 which I have disclosed in connection with the drums G as a service brake may be used under ordinary conditions for gradually checking the vehicle by either pulling rearwardly upon the hand lever 32 or pushing forwardly upon the foot lever 34. Either operation will draw the respective cables 38, 60 forwardly, which through the intermediacy of their connections with the levers 30, will draw the same forwardly and cause the brake bands 2 to contract into frictional engagement with the drums G. The proportions and arrangement of the brake bands 2, the internal shoes 62, and the loose connections of the links 80 with the levers 30 are such that the brake bands 2 may be drawn into sufficient frictional engagement with the drums G to retard or gradually check the speed of the vehicle without applying the internal brake shoes 62, but should an emergency arise requiring quick stoppage of the vehicle, such result may be speedily accomplished by continuing to move the hand lever 32 or the foot lever 34 until all slack in the bolt and slot connections 82 is taken up and the shoes 62 are caused to frictionally engage the internal surfaces of the drums G and thus coact with the brake bands 2 in bringing the vehicle to a quick stop.

From the foregoing description it is apparent that I have provided a brake mechanism embodying the advantages above pointed out, and while I have shown and described the preferred embodiment of said invention, I reserve the right to make such changes as properly fall within the spirit and scope of the invention as claimed.

Having thus described my invention, what I claim and desire to secure by Letters Patent, is:

1. In combination a drum, a braking member adapted to frictionally engage the periphery of said drum, a second braking member adapted to frictionally engage the inner surface of the drum, mechanism for causing one of said braking members to frictionally engage the drum, and means actuated by said mechanism for causing the other braking member to frictionally engage the drum.

2. In combination a drum, a braking member adapted to frictionally engage the periphery of said drum, a second braking member adapted to frictionally engage the inner surface of the drum, mechanism for causing one of said braking members to frictionally engage the drum, and means having a loose connection with said mechanism and operated thereby to cause the second braking member to frictionally engage the drum in sequence with the first braking member.

3. In combination a drum, a braking member adapted to frictionally engage the periphery of said drum, a second braking member adapted to frictionally engage the inner surface of the drum, a stationary bracket adjacent to the drum, a lever operably associated with said bracket and connected to the first braking member, mechanism for operating said lever to thereby cause the first braking member to frictionally engage the drum, a second lever for causing the other braking member to frictionally engage the drum, and means loosely connecting said levers so that the last lever will operate in sequence with the first lever.

4. In combination a drum, a braking member adapted to frictionally engage the periphery of said drum, a second braking member adapted to frictionally engage the inner surface of the drum, a stationary bracket adjacent to the drum, a lever operably associated with said bracket and connected to the first braking member, mechanism for operating said lever to thereby cause the first braking member to frictionally engage the drum, a second lever for causing the other braking member to frictionally engage the drum, and a link pivoted to one lever and having a bolt and slot connection with the other lever so that the last lever will operate in sequence with the first lever.

5. In combination with a drum, a brake band adapted to frictionally engage the periphery of said drum, a brake shoe adapted to frictionally engage the inner surface of the drum, manually controlled mechanism for causing the brake band to frictionally engage the drum, and means operated by said mechanism to cause the brake shoe to frictionally engage the drum in sequence with the brake band.

In testimony whereof I affix my signature, in the presence of two witnesses.

JOHN B. KLEIN.

Witnesses:
L. J. FISCHER,
F. C. FISCHER.